United States Patent
Lee et al.

(10) Patent No.: US 8,100,802 B2
(45) Date of Patent: Jan. 24, 2012

(54) TORQUE CONVERTER CONTROL METHOD AND APPARATUS

(75) Inventors: Chunhao J Lee, Troy, MI (US); Farzad Samie, Franklin, MI (US); Chi-Kuan Kao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1139 days.

(21) Appl. No.: 11/870,673

(22) Filed: Oct. 11, 2007

(65) Prior Publication Data

US 2009/0098978 A1 Apr. 16, 2009

(51) Int. Cl.
*F16H 61/58* (2006.01)
(52) U.S. Cl. .......................................................... 475/62
(58) Field of Classification Search ..................... 74/730, 74/731, 732, 733; 477/166, 168, 169, 176
See application file for complete search history.

(56) References Cited

U.S. PATENT DOCUMENTS

| | | | | |
|---|---|---|---|---|
| 4,880,091 A | * | 11/1989 | Hasegawa et al. | 192/3.3 |
| 5,598,906 A | * | 2/1997 | Ishiguro et al. | 192/3.3 |
| 5,701,982 A | * | 12/1997 | Nakatani et al. | 192/3.3 |
| 5,721,682 A | | 2/1998 | Arai et al. | |
| 6,217,481 B1 | | 4/2001 | Watanabe et al. | |
| 6,223,872 B1 | | 5/2001 | Heller et al. | |
| 6,637,566 B2 | * | 10/2003 | Takatori et al. | 192/3.3 |
| 6,648,795 B2 | * | 11/2003 | Kobayashi | 477/54 |
| 7,189,188 B2 | * | 3/2007 | Nobumoto et al. | 477/176 |
| 7,641,031 B2 | * | 1/2010 | Nakamura et al. | 192/3.31 |
| 7,854,683 B2 | * | 12/2010 | DeGeorge et al. | 477/176 |
| 2005/0222736 A1 | | 10/2005 | Lee et al. | |

\* cited by examiner

*Primary Examiner* — David D Le
*Assistant Examiner* — David J Hlavka
(74) *Attorney, Agent, or Firm* — Quinn Law Group, PLLC (57) ABSTRACT

A method for controlling a torque converter having an internal lockup clutch includes detecting vehicle operating conditions and executing one of a stored plurality of torque converter clutch modes each corresponding to a different set of vehicle operating conditions. A fully-released mode corresponds to vehicle pre-launch, a partially-engaged mode corresponds to post-launch of the vehicle in first gear, downshift, coasting, throttle tip-in, or throttle tip-out; a first fully-engaged mode corresponds to steady-state operation in second gear or a higher; and a second fully-engaged mode corresponds to an upshift. Slippage across the converter is controlled only during the first fully-engaged mode. A vehicle is also provided having an engine, transmission, torque converter with lockup clutch, and controller having a control algorithm. The algorithm executes a different lockup clutch mode based on the detected vehicle operating conditions, and the slippage across the converter is controlled during only one lockup clutch mode.

4 Claims, 5 Drawing Sheets

| TCC MODE | TCC STATUS | OPERATING CONDITIONS | TCC SLIP CONTROL |
|---|---|---|---|
| I | FULLY RELEASED | STOP / PRE-LAUNCH | INACTIVE |
| II | PARTIALLY ENGAGED/ STROKED | POST - LAUNCH POWER ON DOWNSHIFT COASTING THROTTLE TIP-IN/OUT | INACTIVE |
| III | FULLY ENGAGED | STEADY STATE $2^{nd}$ GEAR OR HIGHER | ACTIVE |
| IV | FULLY ENGAGED | POWER ON UPSHIFT | INACTIVE |

TORQUE CONVERTER CONTROL METHOD AND APPARATUS

TECHNICAL FIELD

This invention relates generally to a method and apparatus for controlling the application of and a level of slippage across a torque converter clutch within a hydrodynamic torque converter assembly to thereby improve overall vehicle fuel economy.

BACKGROUND OF THE INVENTION

Automatic power transmissions used in modern vehicles typically include a multi-function hydrodynamic device commonly referred to as a torque converter. A torque converter is a fluid coupling device that automatically disengages a rotating engine crankshaft from a transmission input shaft during vehicle idling conditions to enable the vehicle to stop and/or to shift gears without stalling. Additionally, a torque converter may be used as a torque multiplier for multiplying engine torque in a lower vehicle speed range until the vehicle speed nearly matches engine speed.

Within a torque converter, a pump, a turbine, and a stator combine to enable efficient fluid coupling of the rotating engine and transmission shafts. The pump is the "driving" member of the torque converter assembly giving impetus to a stream of hydraulic fluid, and is connected to the engine crankshaft to rotate in unison therewith for accelerating a supply of hydraulic fluid. The accelerated fluid is directed into the turbine, or the "driven" member of the torque converter assembly. The turbine is typically splined or otherwise directly attached to a transmission input shaft, and thus converts the energy imparted by the fluid stream into useable mechanical energy. This energy is then transferred to the transmission input shaft to propel the vehicle. Finally, the stator is a stationary member redirecting the accelerated fluid stream between the pump and turbine. The stator is connected to a fixed reaction shaft through a one-way clutch to permit the stator to free-wheel when torque multiplication is no longer possible.

Torque converters are designed to slip at low vehicle speeds in order to enable the transmission to rotate at a slower rate relative to the coupled engine. The slip rate gradually diminishes as the vehicle is accelerated up to a threshold speed. Fuel efficiency may be reduced as a result of such slip, however, as only a portion of available engine power is utilized while operating under slip conditions. To minimize slip, torque converters may be configured with a torque converter clutch, also known as a lock-up clutch, which mechanically joins the separate rotating turbine and pump portions of the torque converter. Engagement of a torque converter clutch is generally determined and applied in relation to the throttle/gas position and vehicle speed, locking the turbine and pump above a threshold engine speed.

SUMMARY OF THE INVENTION

Accordingly, a method for controlling a torque converter includes detecting a value of each of a plurality of operating conditions of a vehicle and storing a plurality of torque converter clutch modes each corresponding to a different set of the operating conditions. The plurality of torque converter clutch modes include a fully-released mode, a partially-engaged mode, and at least one fully-engaged mode. The method further includes selectively engaging the torque converter clutch according to a corresponding one of the torque converter modes based on at least one of the detected vehicle operating conditions.

In one aspect of the invention, the fully-released mode corresponds to pre-launch of the vehicle; the partially-engaged mode corresponds to at least one of a post-launch of the vehicle in first gear, a downshift of the transmission, coasting of the vehicle, a throttle tip-in of the vehicle, and a throttle tip-out of the vehicle; the at least one fully-engaged mode includes a first fully-engaged mode corresponding to a steady-state operation of the vehicle in a second gear or higher gear setting, and a second fully-engaged mode corresponding to a power-on upshift of the transmission.

In another aspect of the invention, the first fully-engaged mode further includes actively controlling a level of slip across a turbine and a pump of the torque converter.

In another aspect of the invention, detecting the value of each a plurality of operating conditions includes at least one of determining a speed ratio of the torque converter, detecting a braking level of the vehicle, measuring an input torque request to the transmission, measuring a level of slip across the torque converter, and detecting a gear position of the transmission.

In another aspect of the invention a method of controlling a lockup clutch of a hydrodynamic torque converter includes fully releasing the lockup clutch when the speed ratio is below a threshold speed ratio and the transmission is in first gear; partially engaging the lockup clutch when the speed ratio is above the threshold speed ratio and in first gear; fully engaging the lockup clutch and controlling a slippage level across the torque converter when the transmission is in a steady-state condition within the least one higher gear; and fully engaging the lockup clutch without controlling the slippage level when the transmission is executing a power-on upshift. According to the method, partially engaging the lockup clutch includes supplying pressurized fluid to the lockup clutch at a predetermined pressure that is substantially less than a maximum available clutch pressure.

In another aspect of the invention, the lockup clutch has an apply chamber and a return chamber, and is configured to retain a residual return pressure in the return chamber, with the method further including supplying pressurized fluid to the apply chamber at a predetermined pressure that is sufficiently high to overcome the residual return pressure.

In another aspect of the invention, controlling the slippage level across the torque converter includes correcting a first variance between a desired rotational engine speed and a measured engine speed, and correcting a second variance between a measured slippage level and a desired slippage level.

In another aspect of the invention, a vehicle includes an engine, a transmission having a first gear setting and at least one higher gear setting, and a torque converter having a controllable lockup clutch. A controller has an algorithm adapted for selectively actuating the lockup clutch, and for selectively controlling a slippage amount across the torque converter. The algorithm executes a different one of a plurality of lockup clutch operating modes based on at least one of a plurality of predetermined vehicle operating conditions, wherein the slippage amount is controlled during only one of the plurality of clutch operating modes.

In another aspect of the invention, the plurality of predetermined vehicle operating conditions includes pre-launch, post-launch, coasting, throttle tip in, and throttle tip out of the vehicle, and power-on upshift, power-on downshift, and steady-state operation of said transmission in the at least one higher gear setting.

In another aspect of the invention, the plurality of lockup clutch operating modes includes a first operating mode corresponding to a full release of the lockup clutch, a second operating mode corresponding to a partial engagement of the lockup clutch, and a third and a fourth operating mode each corresponding to full engagement of the lockup clutch, wherein the slippage amount is controlled only during the third operating mode.

In another aspect of the invention, the partial engagement of the lockup clutch includes pressurizing the lockup clutch to a level of between approximately 0 to 2% of a maximum available clutch pressure.

In another aspect of the invention, the lockup clutch includes a piston-actuated multi-plate clutch disposed between an apply chamber and a return chamber. The torque converter includes at least one check ball positioned within a check port for preventing bypass of a pressurized supply of fluid into said return chamber when the lockup clutch is applied, and for allowing an exhaust of said supply of fluid from the return chamber when the lockup clutch is released.

The above objects, features and advantages, and other objects, features and advantages of the present invention are readily apparent from the following detailed description of the best mode for carrying out the invention when taken in connection with the accompanying drawings.

DESCRIPTION OF THE PREFERRED EMBODIMENTS

Figure 1:
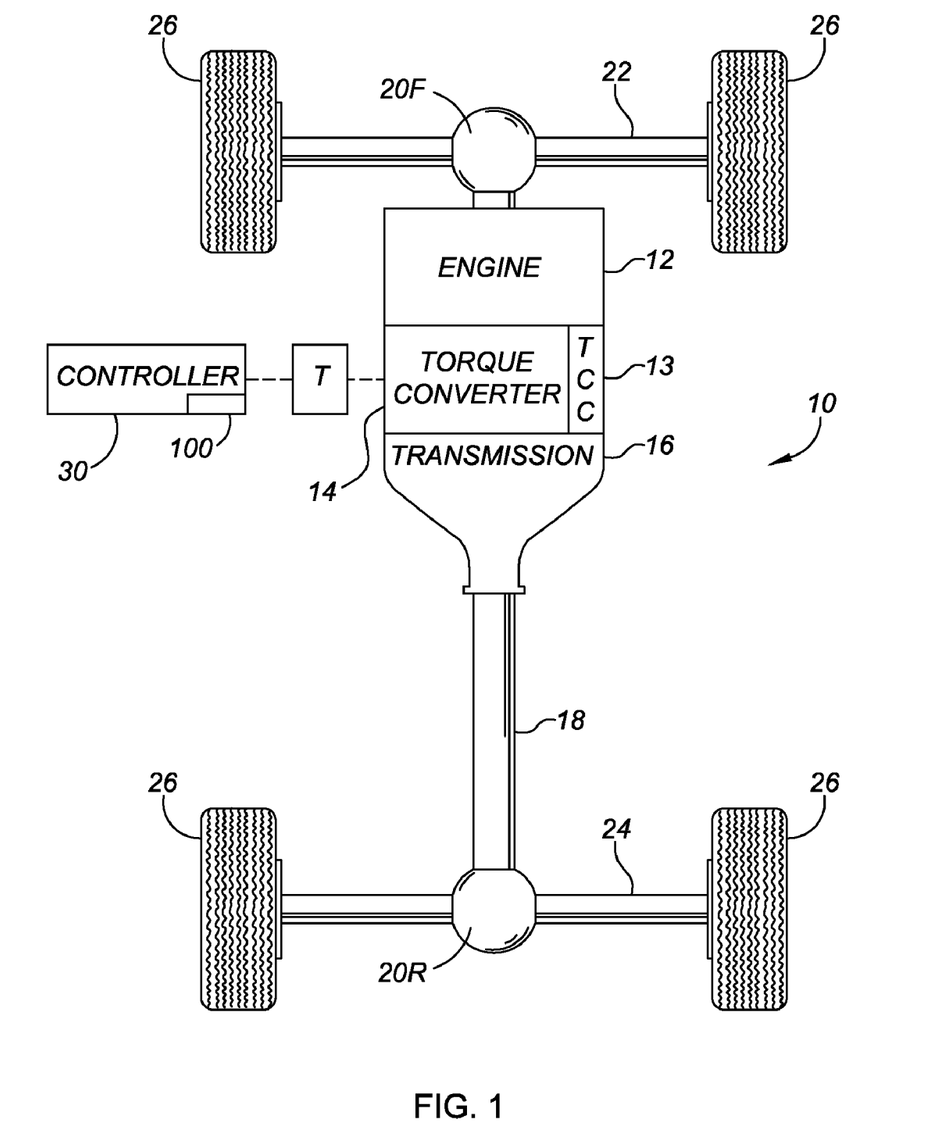
FIG. 1 is a schematic plan view of a vehicle having a controllable torque converter and torque converter clutch according to the invention.

Referring to FIG. 1, wherein like reference numerals refer to like components, a vehicle 10 is shown having a plurality of wheels 26 disposed or positioned on a pair of axles 22 and 24. An energy conversion system or engine 12 is operatively connected to an automatic transmission 16 via a hydrodynamic torque converter assembly 14, referred to hereinafter for simplicity as converter 14. Transmission 16 has a rotatable input member (not shown) and a rotatable output member 18. Engine 12 is preferably a gasoline or diesel fuel engine, although alternative fuel-burning internal combustion engines, fuel cells, or other energy conversion systems capable of powering vehicle 10 may be usable within the scope of the invention.

Engine 12 is selectively connectable or engageable with the input member (not shown) of transmission 16 through converter 14. As will be understood by those of ordinary skill in the art, converter 14 is a hydrodynamic fluid coupling device operable for selectively engaging engine 12 with the input shaft (not shown) of transmission 16, while also simultaneously acting as a torque multiplier, enabling unloaded idle of engine 12, smooth gear ratio changes during acceleration of vehicle 10, and providing driveline torsional vibration damping capabilities.

Depending on whether a front-wheel, rear-wheel, or all-wheel drive configuration is used, one or both axles 22 and 24 may be further adapted for use as drive axles suitable for powering the vehicle 10. To this end, a front and/or rear differential 20F, 20R, respectively, may be employed for transmitting output torque from the transmission 16 to either or both of the axles 22, 24, and/or for distributing output torque along a common axle 22 or 24, for example to prevent slippage on slippery pavement or while the vehicle 10 is cornering.

Using converter 14, torque provided from engine 12 is smoothly transferred to transmission 16, and ultimately to wheels 26 for propulsion of vehicle 10. Converter 14 is in communication with a supply of pressurized fluid (see arrows 15 of FIGS. 2A and 2B), and includes a selectively engagable lock-up clutch or torque converter clutch (TCC) 13 adapted for engaging an impeller or pump 50 and turbine 52 of converter 14, as described hereinbelow with reference to FIGS. 2A and 2B. TCC 13 is controllable via an integrated control unit or controller 30 having a control method or algorithm 100, as described below with reference to FIG. 5.

Controller 30 is configured to provide elements of an overall vehicle control system, preferably including both on-board engine and transmission control system capabilities. Controller 30 is therefore adapted to detect, for example, rotational speed and torque of engine 12, as well as throttle position or transmission output request, which is represented in FIG. 1 simply as "T". Likewise, controller 30 is preferably adapted to detect all necessary parameters of transmission 16, such as input speed, temperature, line pressure, gear settings, positions, or states, and/or brake position or braking request as needed, and as described later below.

Figure 2A:
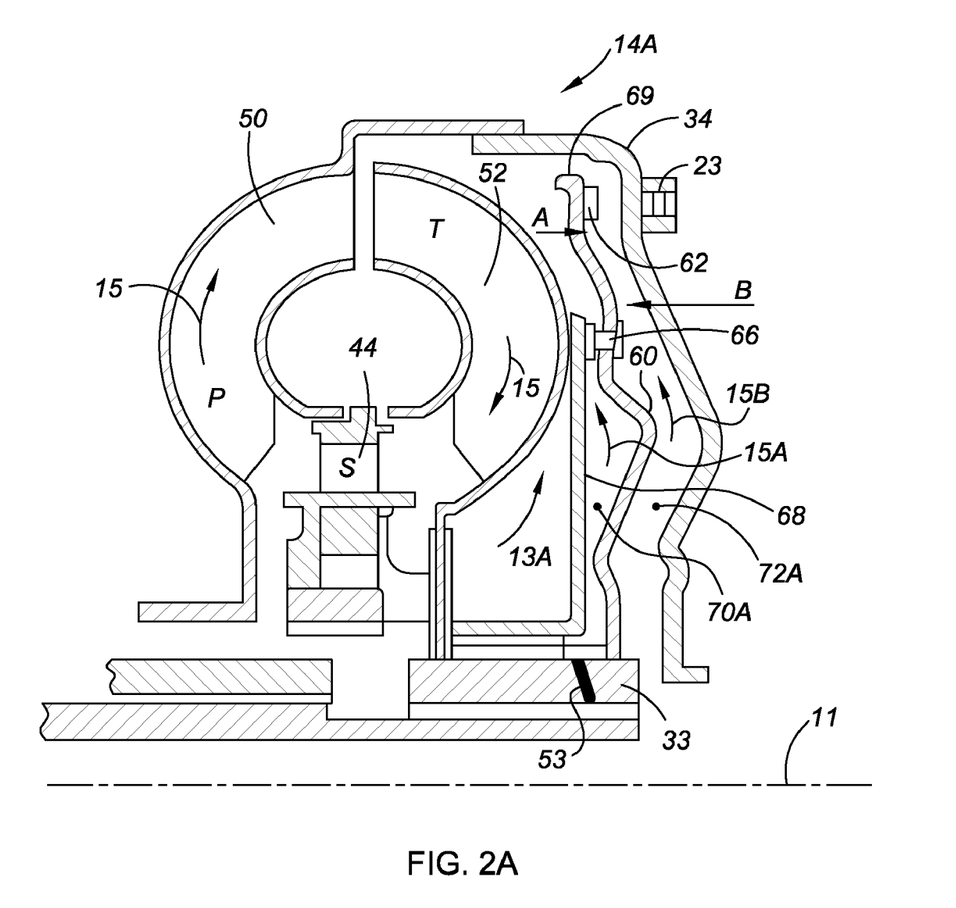
FIG. 2A is cutaway schematic side view of a torque converter and torque converter clutch according to one aspect of the invention.

Referring to FIG. 2A, a schematic illustration is provided for a first type of representative torque converter 14A having an outer shell or cover 34 constructed using any suitable combination of ferrous and/or non-ferrous materials, and that is bolted, welded, or otherwise rigidly attached or connected to an engine flexplate (not shown), such as at a lag bolt well 23, and having a centerline 11. The engine flexplate is ultimately attached to a rotatable engine crankshaft (not shown) as described above for common rotation therewith. Converter 14A includes a turbine (T) 52 connected to a hub 33, an impeller or pump (P) 50, and a stator (S) 44. Converter 14A is configured to admit fluid pressure (arrows 15) into pump 50 as needed, which is then transferred to turbine 52 as described previously hereinabove.

Converter 14A includes a first type of torque converter clutch or TCC 13A. TCC 13A as shown is a representative single face clutch operable in response to a controllable source of pressure (arrow 15), which is reversible as needed to alternately engage and disengage TCC 13A. TCC 13A includes a clutch plate 60, a friction surface 62 applied or attached to a radial outer end 69 of clutch plate 60, and a drive disc 68 coupled for rotation to clutch plate 60 such as by a rivet connector 66 or other suitable connection means. Drive disc 68 and clutch plate 60 are axially slidable on hub 33, and drive disc 68 is splined onto hub 33. Clutch plate 60 defines a pair of opposing clutch chambers, i.e. an apply chamber 70 and a return chamber 72.

When pressure (arrow 15A) that is admitted to apply chamber 70, such as through a fluid channel 53, exceeds that (arrow 15B) in return chamber 72, there is a resultant force in apply chamber 70 which moves friction surface 62 into engagement with cover 34 in the direction of arrow A. This force tends to reduce relative slippage between pump 50 and turbine 52, and when sufficiently great, fully engages TCC 13A to eliminate slippage across converter 14A altogether. Likewise, when pressure (arrow 15B) in the return chamber 72 exceeds the pressure (arrow 15A) in apply chamber 70, there is a resultant force in return chamber 72 that tends to move friction surface 62 out of engagement with cover 34 in the direction of arrow B, thereby increasing slippage between the pump 50 and the turbine 52.

Figure 2B:
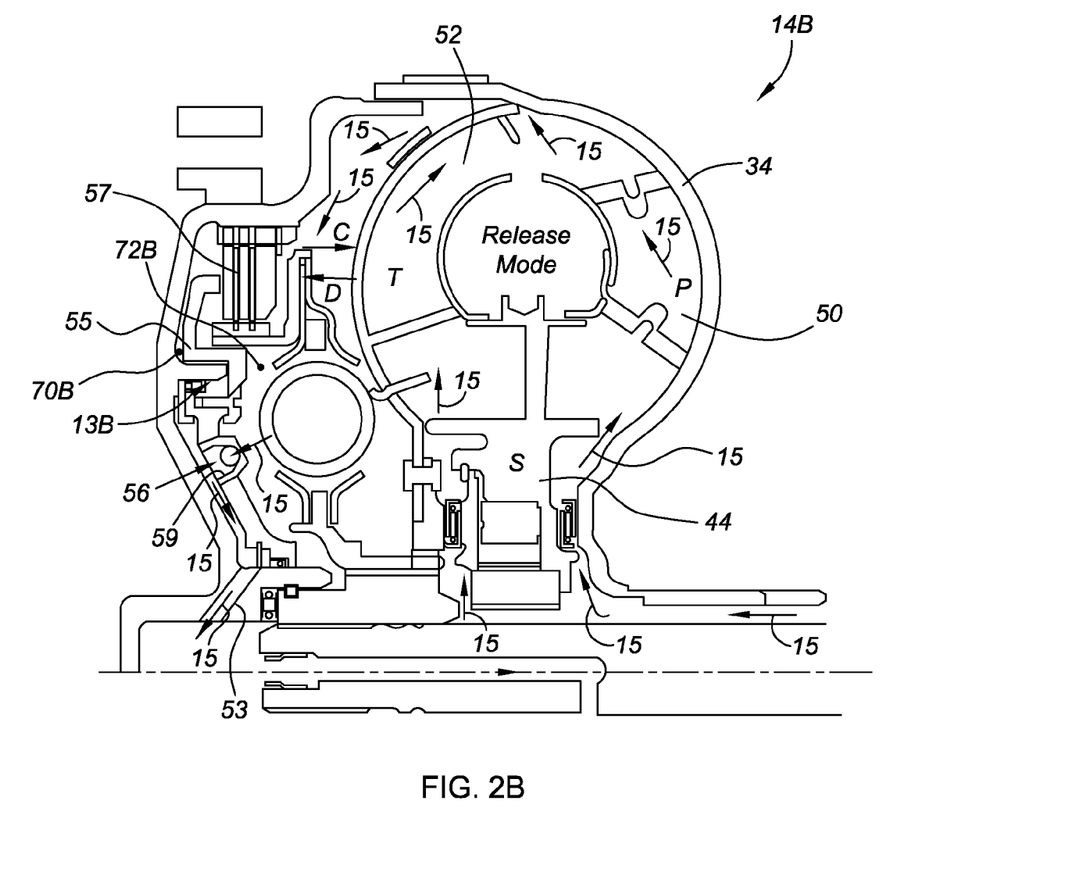
FIG. 2B is a cutaway schematic side view of another torque converter and torque converter clutch according to another aspect of the invention.

Referring to FIG. 2B, other embodiments of converter 14A of FIG. 2A may be usable within the scope of the invention, such as an alternate converter 14B. Converter 14B includes a multi-plate torque converter clutch or TCC 13B. As shown in FIG. 2B, TCC 13B is in release mode, and therefore shows the direction of pressurized fluid (arrows 15) through converter 14B when TCC 13B is released or disengaged. As will be understood by those of ordinary skill in the art, reversing the direction of pressurized fluid (arrows 15) results in an apply mode, as described hereinbelow.

TCC 13B is configured to operate in much the same manner as TCC 13A of FIG. 2A described above, with a few notable differences in structure and operation. With TCC 13B, a multi-plate clutch pack 57 is disposed between apply chamber 70B and return chamber 72B, and is acted upon by a TCC piston 55 in response to a force acting upon piston 55 in the direction of arrow C. Movement of clutch pack 57 tends to engage turbine 52 and pump 50 as described above so that turbine 52 and pump 50 begin to rotate in unison. When so engaged, fluid pressure is admitted to apply chamber 70B through fluid channel 53, with a device such as a check ball 56 disposed in a check port 59 or another similar device provided for preventing fluid bypass into return chamber 72B.

To release or disengaged TCC 13B, pressure is reversed to match the direction shown in FIG. 2B, thus forcing TCC piston 55 in the direction of arrow D to disengage clutch pack 57. Fluid pressure may then move check ball 56 to allow pressurized fluid (arrow 15) to exhaust from return chamber 72B through check port 59 and fluid channel 53. A residual return force may remain in return chamber 72B in the direction of arrow D, i.e. acting upon TCC piston 55. As will be explained later hereinbelow, any partial engagement or stroke of TCC 13B must therefore be applied at a pressure that is sufficiently high to overcome this residual return force.

The steps of method or algorithm 100 (see FIGS. 1 and 3) of this invention as described below ultimately act to selectively control the pressure applied to TCC 13A, 13B of FIGS. 2A and 2B, respectively, at each of the apply and release chambers 70A, 70B and 72A, 72B, respectively, as needed in order to control slippage between turbine 52 and pump 50 in different ways during various predetermined and detectable operating modes or conditions of transmission 16 (see FIG. 1), as will now be explained.

Figure 3:
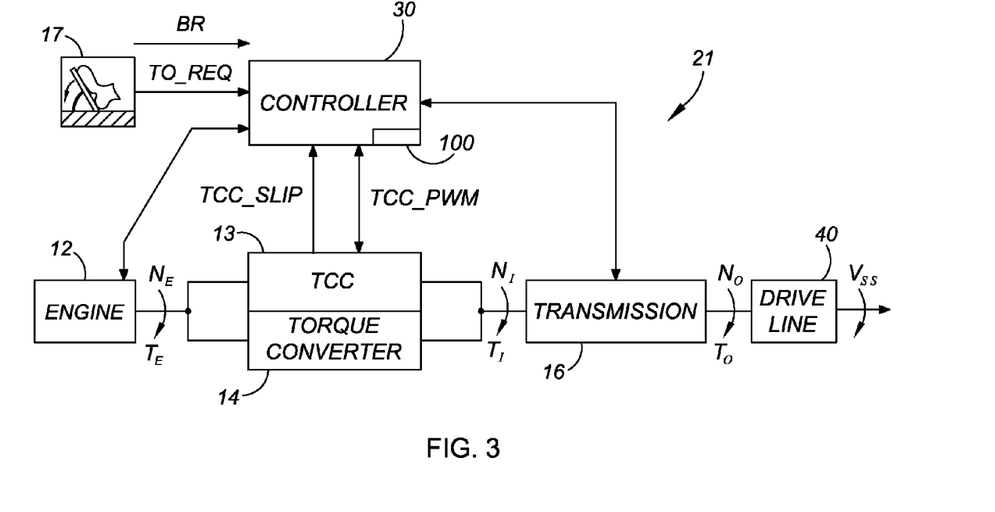
FIG. 3 is a schematic representation of a powertrain of the vehicle shown in FIG. 1.

Referring to FIG. 3, a torque converter control system 21 includes engine 12, converter 14, transmission 16, and controller 30 as described above, which are connected to a driveline 40 of vehicle 10 (see FIG. 1). Engine 12 is controlled by controller 30 in response to an output torque request, abbreviated TO_REQ, and a braking request, abbreviated BR, from a user interface (box 17). Interface 17 may take the form of one or more pedals, buttons, levers, and/or other devices providing one or more operator commands for selectively controlling engine 12 and/or transmission 16. Controller 30 is preferably operable for generating a pulse-width-modulated (PWM) signal having a variable duty cycle effective to control pressure supplied to TCC 13 as needed.

Engine power output, depicted as a measurable or detectable engine rotational speed $N_E$ measured in revolutions per minute (rpm), and a measurable or detectable engine torque input $T_E$ measured in Newton-meters (N-m), can be transmitted across converter 14 and TCC 13 to an input shaft (not shown) of transmission 16. Transmission 16 has measurable or detectable inputs of transmission input speed $N_I$ and an input torque $T_I$, and likewise, has measurable or detectable outputs of transmission output speed $N_O$ and output torque $T_O$, with transmission 16 being operatively connected to driveline 40 for delivering tractive drive torque to one or more vehicle wheels 26 (see FIG. 1), characterized by a vehicle speed parameter $V_{SS}$.

Converter 14 and TCC 13 typically operate in the following manner: TCC 13 may be either fully released, partially engaged/stroked, or fully engaged with either active or inactive slip control, as described below. When TCC 13 is fully released, there is unrestrained slippage between pump 50 and turbine 52 (see FIGS. 2A and 2B), and torque is transmitted therebetween based upon a flow of hydraulic fluid between turbine 52 and pump 50. When TCC 13 is actuated in a slip mode, there is slippage between pump 50 and turbine 52, with a resulting difference in rotational speeds therebetween. Torque is transmitted between pump 50 and turbine 52 through the flow of hydraulic fluid (arrow 15 of FIGS. 2A and 2B) and through the actuated TCC 13, with slippage in the system absorbing perturbations of engine 12 and driveline 40. The amount of slippage (TCC_SLIP) may therefore be communicated to controller 30 as needed, as described below.

When TCC 13 is fully engaged, the difference in rotational speeds of pump 50 and turbine 52 are approximately equal, and torque is transmitted therebetween through TCC 13. TCC 13 is controlled by the PWM signal (TCC_PWM) from controller 30 described above, such that when the PWM duty cycle is relatively low, commanded pressure in TCC 13 is low, and converter 14 thus functions as a normally fluidic pump device, as previously described. When the PWM duty cycle is increased, hydraulic pressure increases, increasing pressure in TCC 13 and mechanically engaging pump 50 and turbine 52, with a minimal level of slippage therebetween, for example approximately 10 to 20 revolutions per minute (rpm), calculated using the equation ($N_E$-$N_I$) based upon the clutch pressure of TCC 13, engine torque and speed, and other operating conditions. After vehicle 10 (see FIG. 1) surpasses a threshold speed, TCC 13 may be fully locked so that the turbine 52 and pump 50 rotate in unison.

System 21 includes sensing devices (not shown) operative to directly or remotely sense operator demands, and operating conditions of engine 12 and transmission 16. Operator demands, depicted as output torque request TO_REQ from interface 17 in FIG. 3, typically include demands for torque in the form of desired acceleration and braking inputs such as would be commanded via an accelerator pedal and a brake pedal, respectively. Operating conditions of engine 12 are determined using sensing devices installed on or in proximity to engine 12 to monitor physical characteristics and generate signals which may be correlated to parameters of engine 12 and ambient parameters, specifically an engine operating point.

Figure 4:
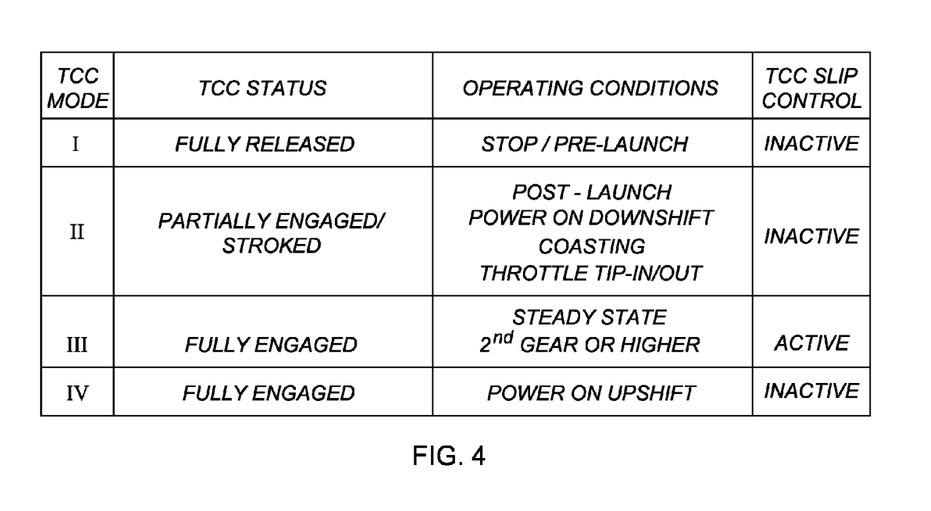
FIG. 4 is a table describing the preferred modes of operation of the torque converter clutch shown in FIGS. 1, 2, and 3.

Referring to FIG. 4, a table is shown describing four preferred modes of operation of TCC 13 as represented by the embodiments of TCC 13A of FIG. 2A and TCC 13B of FIG. 2B, as they relate to a vehicle drive maneuver and/or transmission position. TCC 13 will be used hereinafter for simplicity to refer generally to the torque converter clutch of the invention. Controller 30 (see FIG. 1) is configured, programmed, and/or adapted to selectively activate and deactivate automatic slip control of TCC 13 (see FIGS. 1-3) as needed based on the detected or determined corresponding TCC Mode I-IV of FIG. 4. As will be understood by those of ordinary skill in the art, slip control parameters may be predetermined and stored in controller 30 to maintain a predetermined level or amount of slippage across converter 14 at or substantially near a desired level, which is typically a difference in revolutions per minute (Δrpm) across TCC 13.

Typical slip control methodology may include comparing a measured slippage value across TCC 13 to a stored desired slippage value. When the difference between the measured or determined slippage value and the desired slippage value exceeds a known deadband slip (DB), the duty cycle of PWM signal TCC_PWM (see FIG. 3) is increased by a sufficient amount as needed to maintain desired slippage value. As used herein, the term "deadband slip" (DB) refers to a predetermined hysteresis slip value, also measured in Δrpm, which accounts for known or inherent errors and delays related to mechanical, hydraulic, electrical, and/or measurement system operations.

Likewise, when the determined slippage value is less than the desired slippage value by an amount greater than the stored deadband slip (DB), the duty cycle of the PWM control signal TCC_PWM is sufficiently decreased. Preferably, any slip control strategy includes a combination of slip feedback compensation and feed-forward pressure control, with the feedback compensation methodology preferably determined as explained previously hereinabove. Feed-forward pressure, as explained hereinbelow, is preferably proportional to estimated engine torque, as the majority of torque from engine 12 (see FIG. 1) is expected to be transmitted through torque converter 14 when slip control is active. Such feedback compensation may be synthesized using any available feedback control theory, such as proportional and integral (PI) control.

Still referring to FIG. 4, TCC Mode I, i.e. fully released mode, corresponds to a vehicle operating condition at which vehicle 10 (see FIG. 1) is at a stop or is otherwise at rest in a pre-launch state, i.e. ready to launch or start out from a first gear setting. TCC Mode II corresponds to a partially engaged or "stroked" mode such that apply chambers 70A, 70B (see FIGS. 2A and 2B, respectively) are substantially filled with pressurized fluid to a pressure sufficient to overcome any residual return force that may be present in return chamber 72A or 72B, and corresponds to one of a plurality of possible vehicle operating conditions. These operating conditions include post-launch operation of vehicle 10 (see FIG. 1) as described below; power-on downshift of transmission 16 (see FIGS. 1 and 3) that is actively occurring from a higher-to-lower gear position, for example a 2-1, 3-2, 4-3 downshift event; a no-throttle/coasting condition; or an abrupt change in throttle request, also referred to as throttle tip-in/tip-out mode. TCC Mode III, i.e. a fully engaged mode with active slip control, corresponds to a condition at which vehicle 10 (see FIG. 1) is sustained in steady-state in a gear position higher than first gear, i.e. $2^{nd}$ gear or higher. Finally, TCC Mode IV, i.e. fully engaged with interrupted or suspended slip control, corresponds to an operating condition at which a power-on upshift is occurring in transmission 16 (see FIGS. 1 and 3), for example a 1-2, 2-3, or a 3-4 upshift. The four preferred TCC modes of operation described in FIG. 4 are referred to hereafter with reference to FIG. 5.

Figure 5:
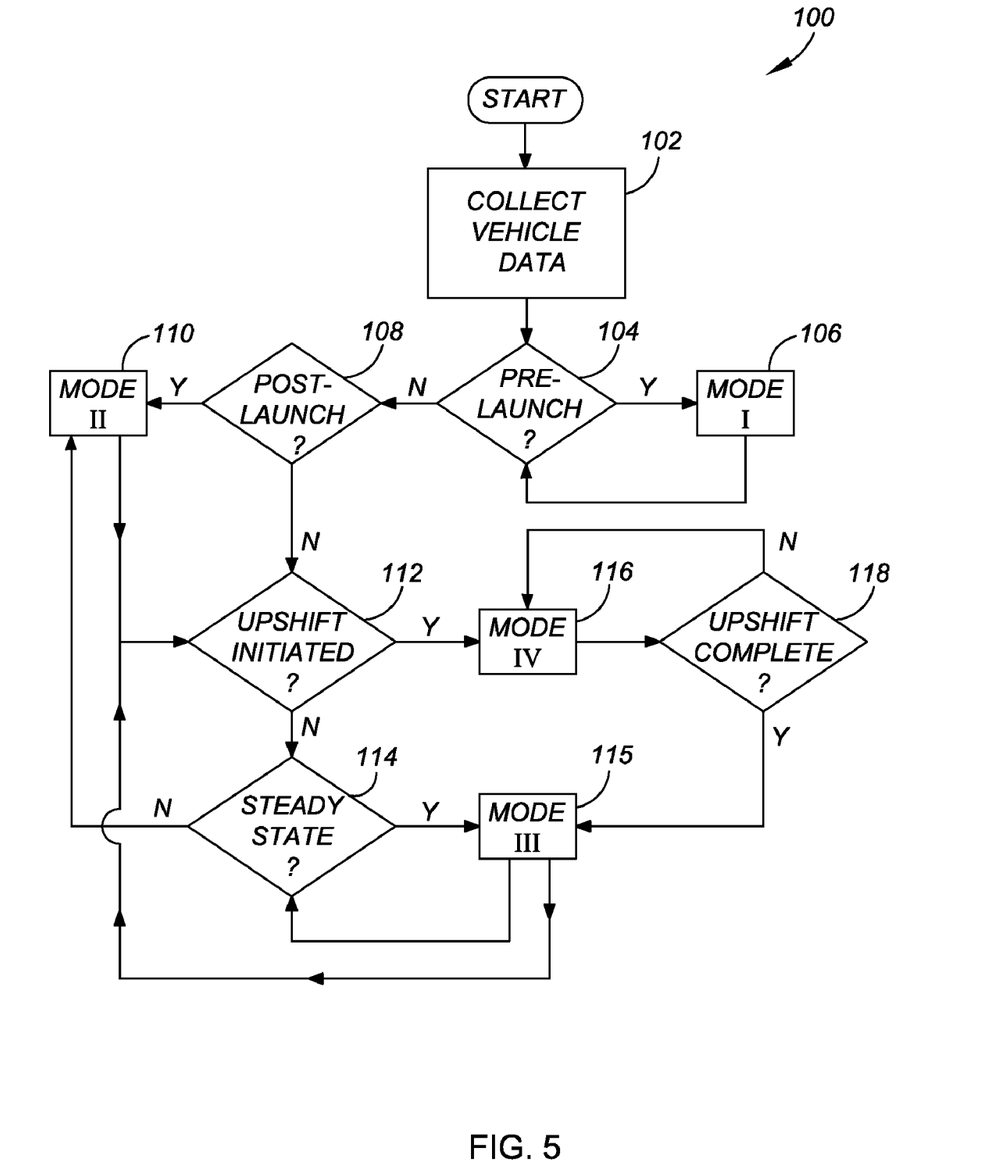
FIG. 5 is a schematic flow chart describing a torque converter clutch control method according to the invention.

In FIG. 5, a method, flow chart, or algorithm 100 is shown, with algorithm 100 being programmed or stored in memory (not shown) of controller 30 (see FIG. 1), and which is effective to control actuation and operation of TCC 13 (see FIGS. 1, 2, and 3) and to activate or suspend slip control of converter 14 of FIGS. 1, 2, and 3 as needed during ongoing operation of vehicle 10 (see FIG. 1). Algorithm 100 is event or condition driven, such that both the apply and slip control status of TCC 13 is determined by a corresponding vehicle operating condition, as will now be explained.

Beginning with step 102, algorithm 100 continuously collects the necessary vehicle data or performance parameters, and is configured to determine the transmission status or operating condition of transmission 16 (see FIG. 1) therefrom. The measured or calculated values of each parameter are temporarily stored or recorded in memory (not shown) of controller 30 (see FIGS. 1 and 3). Preferred vehicle data parameters include the speed of engine 12 (see FIGS. 1 and 3), the speed of turbine 52 (see FIGS. 2A and 2B), a level of slip (TCC_SLIP) across TCC 13 of converter 14, the speed ratio of converter 14 (see FIGS. 1-3), i.e. the speed ratio of pump 50 to turbine 52 (see FIGS. 2A and 2B), or alternately the speed ratio of transmission input speed $N_I$ to engine speed $N_E$ (see FIG. 3), the detected gear setting or position, the measured or detected braking level BR (See FIG. 3) and/or desired transmission deceleration level, and the output torque request TO_REQ (see FIG. 3). However, other vehicle data parameters may be envisioned that are usable within the scope of the invention. Algorithm 100 then proceeds to step 104.

At step 104, algorithm 100 uses the vehicle data collected at step 102 to determine if transmission 16 (see FIGS. 1 and 3) is in an idle or first gear pre-launch status, as described above. If transmission 16 is determined to be in an idle or first gear pre-launch status, algorithm 100 proceeds to step 106, otherwise algorithm 100 proceeds to step 108.

At step 106, controller 30 executes TCC Mode I (see FIG. 4). In TCC Mode I, TCC 13 is fully disengaged or released. Converter 14 is allowed to transmit power from engine 12 (see FIGS. 1 and 3). Hydraulic fluid pressure (arrow 15 of FIGS. 2A and 2B) is controlled in an appropriate manner to ensure complete disengagement of TCC 13, and any apply chamber such as apply chamber 70A, 70B of FIGS. 2A, 2B, respectively, is substantially vacated or emptied. As vehicle 10 (see FIG. 1) begins to move, the speed ratio of converter 14 in turn increases until converter 14 nears its mechanical coupling point, which occurs at a speed ratio of approximately 0.75, then fully enters or engages first gear at a torque converter speed ratio of approximately 0.9. TCC Mode I is then sustained, i.e. steps 106 and 104 repeat as a loop, until algorithm 100 detects or determines that the stored vehicle operating parameters (see step 102) no longer correspond to a stop or pre-launch transmission status, at which point algorithm 100 proceeds to step 108.

At step 108, algorithm 100 compares the vehicle data parameters continuously collected and updated at step 102 to determine if transmission 16 is presently in a first gear post-launch condition, i.e. vehicle 10 is no longer idle, is in first gear above an appropriate torque converter speed ratio, and that a power-on upshift is not presently occurring. If such a condition is determined, algorithm 100 proceeds to step 110, unless a power-on upshift is detected, in which case algorithm 100 proceeds instead to step 112.

At step 110, controller 30 executes TCC Mode II, which as described above with reference to FIG. 4 corresponds to a post-launch condition and partial engagement or "stroke" of TCC 13 (see FIGS. 1, 2A, 2B, and 3). Pressure (arrow 15 of FIGS. 2A and 2B) supplied to TCC 13 is reversed or otherwise controlled so that TCC 13 is ready to be fully applied rapidly when needed. In a single plate design such as the TCC 13A of FIG. 2A, or a similar design wherein essentially zero return force need be overcome within TCC 13A, apply cavity 70A is preferably filled and pressure (arrow 15) set to zero or near zero, such that TCC 13A is "snug" but carries no or very little torque. A slip level across TCC 13 approximately equals that which would be present in a fully released mode, i.e. TCC Mode I. TCC Mode II is preferably sustained during coasting, throttle tip in/out, and through power-on downshift maneuvers, wherein TCC 13 remains stroked so as to allow engine 12 (see FIGS. 1 and 3) to rev at a higher rate, and to allow converter 14 (see FIGS. 1-3) to provide some level of torque multiplication sufficient to provide a more enjoyable ride quality. Algorithm 100 remains at step 110, and therefore controller 30 sustains TCC Mode II, i.e. repeats steps 112 and 114 in a loop with step 110, until it is determined that an upshift has been initiated (see step 112) or a steady-state operating condition exists (see step 114), upon determination of which algorithm proceeds to step 116 and step 115, respectively.

At step 112, algorithm 100 determines whether a power-on upshift is initiated or otherwise has been commanded. If so, algorithm 100 proceeds to step 116, otherwise algorithm 100 proceeds to step 114.

At step 114, algorithm 100 having determined at step 112 that a power-on upshift is not presently initiated, determines whether the detected vehicle conditions (see step 102) otherwise indicate a steady-state operating condition. As used herein, steady-state operating condition refers to the operation of transmission 16 (see FIGS. 1 and 3) in a gear position or setting of second gear or higher, and that a power-on downshift, coasting, throttle tip-in, or throttle tip-out are not occurring. If algorithm 100 determines that such a steady-state condition is present, algorithm 100 proceeds to step 115. If, however, algorithm 100 determines that a power-on downshift, coasting, or throttle tip in/tip out is occurring, algorithm 100 proceeds to step 110.

At step 115, algorithm 100 executes TCC Mode III (see FIG. 4). In TCC Mode III, which is a steady-state mode as described above in which transmission 16 (see FIGS. 1 and 3) remains in a gear setting of second gear or higher and no downshift, coasting, or throttle tip in/out is occurring. TCC 13 (see FIG. 1-3) is immediately fully applied or engaged, and slip control of converter 14 (see FIGS. 1-3) is activated. Algorithm 100 then simultaneously repeats step 112 to determine whether an upshift has been initiated from steady state, and step 114 to determine whether such a steady-state continues, continuously executing TCC Mode III so long as steady state is sustained. As shown in FIG. 5, if algorithm 100 determines that steady-state conditions no longer exists and an upshift has not been initiated from steady state, algorithm 100 proceeds to step 110.

The application of TCC 13 and activation of slip control in TCC Mode III according to algorithm 100 is preferably as follows: as controller 30 (see FIGS. 1 and 3) initially enters TCC Mode III, pressure delivered to TCC 13 is raised from an initial pressure level ($Pr_{ini}$) of zero to a target pressure level, which is preferably set to a feed-forward pressure level ($Pr_{ffd}$). Feed-forward pressure ($Pr_{ffd}$) is proportional to estimated engine torque ($Tq_{est\_eng}$), and may be described by the equation $Pr_{ffd}=Ke_{ratio} \cdot Tq_{est\_eng}$. The pressure supplied to TCC 13 (see FIGS. 1, 2A, and 2B), or $Pr_{tcc}$, is described by the equation $Pr_{tcc}=(t/Ke_{ramptime}) \cdot (Pr_{ffd}+Pr_{ini})$, where t represents time and the value $Ke_{ramptime}$ is set within a calibratable time range, preferably approximately 0.6 to 1 second.

As soon as the pressure supplied to TCC 13 ($Pr_{tcc}$) reaches the target or feed-forward level ($Pr_{ffd}$), slip feedback compensation ($Pr_{fb}$) is activated. This pressure ($Pr_{tcc}$) is described by the equation $Pr_{tcc}=Pr_{ini}+Pr_{ffd}+Pr_{fb}$, and $Pr_{fb}=K_p \cdot \omega_{error}+Ki \cdot (\Sigma\omega_{error})$. As will be understood by those of ordinary skill in the art, the feedback control gain factors $K_p$ and $K_i$ respectively refer to the proportional and integral gain. Feedback control preferably involves two control strategies, i.e. engine speed control and slip speed control.

With respect to engine speed control, depending on the particular shift schedule, the speed of turbine 52 (see FIGS. 2A and 2B) may be as low as, for example, 700 rpm at the end of an upshift. Engine speed is however preferably maintained at a higher level, such as 950 rpm or higher in the preceding 700 rpm example, due to such design factors as transmission pump capacity issues that may be present at relatively low engine speeds. Therefore, the preferred feedback compensation corrects the error or variance between a desired rotational engine speed ($\omega_{desire\_eng}$) and a measured engine speed ($\omega_{eng}$) via the equation $\omega_{error}=\omega_{eng}-\omega_{desire\_eng}$.

With respect to slip speed control, when the speed of turbine 52 exceeds a threshold as determined by minimum engine speed, the slip speed ($\omega_{slip}$) of TCC 13 is used for error compensation, wherein $\omega_{error}=\omega_{slip}-\omega_{desire\_slip}$. The desired slip speed ($\omega_{desire\_slip}$) is calibratable and set to be a function of speed of engine 12 or turbine 52.

At step 116, algorithm 100 determine a power-on upshift has been commanded and is about to occur, and executes TCC Mode IV, thereby suspending or interrupting active slip control as described above. Transients occurring during the inertia phase of an upshift cause slippage across TCC 13 to increase, and consequently, active slip control is preferably interrupted or suspended during the inertia phase, such that slip control does not overcompensate for any error occurring during such transients. Algorithm 100 then proceeds to step 118.

At step 118, algorithm 100 determines when the upshift (see step 106) is complete. If complete, algorithm 100 proceeds to TCC Mode III described at step 115, where slip feedback control is restored or reactivated, thus making the application of TCC 13 transparent to occupant of vehicle 10 (see FIG. 1). Step 118 and step 116 repeat as a loop until such an upshift is determined to be complete, and then proceeds to step 115.

While the best modes for carrying out the invention have been described in detail, those familiar with the art to which this invention relates will recognize various alternative designs and embodiments for practicing the invention within the scope of the appended claims.

The invention claimed is:

1. A method of controlling a lockup clutch of a hydrodynamic torque converter having a speed ratio and being operable for transmitting torque between an engine and a transmission, the transmission having a first gear and at least one higher gear, the method comprising each of:
   fully releasing the clutch without controlling a slippage level of the clutch when the speed ratio is below a threshold speed ratio and the transmission is in the first gear;
   partially engaging the clutch when the speed ratio rises above the threshold speed ratio without controlling said slippage level while still operating in said first gear;
   fully engaging the clutch and controlling said slippage level across the clutch when the transmission exits said first gear and is operating in a steady-state within said at least one higher gear; and
   fully engaging the clutch without controlling said slippage level when the transmission is executing a power-on upshift from said at least one higher gear;
   wherein said partially engaging the clutch includes supplying pressurized fluid to the clutch at a predetermined pressure that is substantially less than a maximum available clutch pressure.

2. The method of claim 1, wherein said threshold speed ratio is approximately 0.7.

3. The method of claim 1, wherein said clutch has an apply chamber and a return chamber, and is configured to retain a residual return pressure in said return chamber, the method further comprising supplying said pressurized fluid to said apply chamber at a said predetermined pressure that is sufficiently high to overcome said residual return pressure.

4. The method of claim 1, wherein said controlling said slippage level across the clutch includes correcting a first variance between a desired engine speed and a measured engine speed, and correcting a second variance between a measured slippage level and a desired slippage level.

* * * * *